(12) United States Patent
Lucchesi et al.

(10) Patent No.: US 11,214,742 B2
(45) Date of Patent: Jan. 4, 2022

(54) APPARATUS AND METHODS TO REMOVE SOLIDS FROM HYDROCARBON STREAMS

(71) Applicant: ExxonMobil Research and Engineering Company, Annandale, NJ (US)

(72) Inventors: Robert P. Lucchesi, Flemington, NJ (US); Mohsen S. Yeganeh, Hillsborough, NJ (US); Geoffrey M. Keiser, Morris Plains, NJ (US); Jessica L. Vreeland, Phillipsburg, NJ (US); Thomas Bruno, Stanhope, NJ (US)

(73) Assignee: EXXONMOBIL RESEARCH AND ENGINEERING COMPANY, Annandale, NJ (US)

(*) Notice: Subject to any disclaimer, the term of this patent is extended or adjusted under 35 U.S.C. 154(b) by 301 days.

(21) Appl. No.: 15/908,952

(22) Filed: Mar. 1, 2018

(65) Prior Publication Data

US 2018/0251689 A1    Sep. 6, 2018

Related U.S. Application Data

(60) Provisional application No. 62/466,460, filed on Mar. 3, 2017.

(51) Int. Cl.
| | |
|---|---|
| *C10G 31/08* | (2006.01) |
| *B01D 21/00* | (2006.01) |
| *B01D 21/24* | (2006.01) |
| *C10C 3/00* | (2006.01) |
| *C10G 1/04* | (2006.01) |
| *C10G 33/04* | (2006.01) |
| *B03D 1/02* | (2006.01) |

(52) U.S. Cl.
CPC ......... *C10G 31/08* (2013.01); *B01D 21/0069* (2013.01); *B01D 21/245* (2013.01); *B03D 1/026* (2013.01); *C10C 3/007* (2013.01); *C10G 1/045* (2013.01); *C10G 33/04* (2013.01); *C10G 2300/205* (2013.01); *C10G 2300/208* (2013.01)

(58) Field of Classification Search
CPC ........ C10G 33/04; C10G 31/08; C10G 1/045; C10G 2300/205; C10G 2300/208; B01D 21/0069; B01D 21/245
See application file for complete search history.

(56) References Cited

U.S. PATENT DOCUMENTS

| | | | |
|---|---|---|---|
| 3,481,713 A * | 12/1969 | Titus | B01D 11/0223 23/300 |
| 4,938,876 A | 7/1990 | Ohsol | |
| 2003/0000186 A1* | 1/2003 | West | B04C 5/28 55/459.1 |
| 2004/0222164 A1 | 11/2004 | Conaway et al. | |

(Continued)

OTHER PUBLICATIONS

The International Search Report and Written Opinion for PCT/US2018/020365 dated May 11, 2018.

*Primary Examiner* — Prem C Singh
*Assistant Examiner* — Brandi M Doyle
(74) *Attorney, Agent, or Firm* — Robert A Migliorini

(57) ABSTRACT

Apparatus, processes, and systems for removal of solids from a hydrocarbon stream. The present disclosure utilizes a surfactant to reduce interfacial tension between a hydrocarbon phase and a water (or aqueous) phase to promote solids to be pulled by gravity out of the hydrocarbon phase and into the water phase.

16 Claims, 5 Drawing Sheets

(56) References Cited

U.S. PATENT DOCUMENTS

| | | | |
|---|---|---|---|
| 2008/0169222 A1* | 7/2008 | Ophus | C10G 1/047 |
| | | | 208/390 |
| 2011/0309001 A1* | 12/2011 | Soane | C09K 8/524 |
| | | | 208/390 |
| 2013/0098806 A1* | 4/2013 | Hollander | C10G 1/045 |
| | | | 208/391 |
| 2013/0126448 A1* | 5/2013 | McCabe | B01D 19/0036 |
| | | | 210/801 |
| 2014/0166537 A1 | 6/2014 | Kremer et al. | |
| 2014/0262947 A1* | 9/2014 | Brown | C10G 47/02 |
| | | | 208/102 |

* cited by examiner

APPARATUS AND METHODS TO REMOVE SOLIDS FROM HYDROCARBON STREAMS

CROSS-REFERENCE TO RELATED APPLICATIONS

This application claims the benefit of U.S. Provisional Application No. 62/466,460, filed on Mar. 3, 2017, the entire contents of which are incorporated herein by reference.

FIELD

This disclosure relates to apparatus and methods for the removal of solids from hydrocarbon streams.

BACKGROUND

Hydrocarbon streams, such as oil sands, crude oils, asphalt, bitumens, etc. typically carry varying amounts of solids within the hydrocarbon stream. Excessive inorganic or organic solids in hydrocarbon streams negatively affect hydrocarbon processing by exacerbating fouling in heat exchangers, stabilizing emulsion in desalters, as well as reducing the value of hydrocarbon products. Oil sand contains a high amount of solids which complicates oil recovery. In addition, solids can clog burners, plug catalyst feed channels and deactivate catalysts. In heat exchangers heavy crude components (e.g. asphaltene) adsorb onto solids causing them to attach onto the tube surface. The adsorbed solids provide a nucleating growth site for the foulant. In a desalter, solids adsorb onto the water/oil interface, preventing electrocoalescence within the electrodes of the desalter. Solids can also reside at the effluent water/oil interface at the bottom of a desalter and prevent coalesced water droplets from immersing into the effluent water. This creates a rag layer that is detrimental in the desalting operation.

Current practice to remove solids consists of filters (electrostatic filters, membranes, adsorbents, hydrocyclones), gravity sedimentation, and froth treatments. Using filters is costly and not practical for viscous materials with significant suspended solids such as some crude oils—i.e. the filters become clogged too quickly for efficient operation. Gravity sedimentation is only effective for larger suspended solids. Finer solids will remain suspended in the crude oil fraction and will not deposit on the bottom of the crude oil settling tank. Froth treatment is an oil refining technique which converts bitumen recovered from oil sands to diluted bitumen through use a naphthenic or paraffinic solvent, which promotes gravitational separation of solids from the bitumen. Froth treatments are costly due to the high volume of solvent required.

A less costly, but effective, method for removing solids from hydrocarbon streams would be advantageous. This disclosure provides apparatus and methods for solids removal from hydrocarbon streams using only gravity and a small amount of surfactant to promote solids extraction from the oil phase to a water phase resulting in a reduced solids hydrocarbon product stream.

SUMMARY

Provided herein are apparatus, systems, and processes related to solids removal from hydrocarbon streams. It should be understood that reference to an apparatus, system, or process individually does not imply that said reference has limited application to the specific apparatus, system, or process. Rather, aspects of any of the apparatus can have applicability to the systems and processes, aspects of any of the systems can have applicability to the processes and apparatus, and so on. In one aspect, a process for removing solids from a hydrocarbon stream is provided, the process comprising hydrocarbon streams: providing an initial hydrocarbon stream, wherein the hydrocarbon stream contains an amount of solids; feeding the hydrocarbon stream to a solids removal unit through an inlet, wherein the solids removal unit comprises a vessel, a distributor plate system, a reduced solids outlet, an extracted solids outlet, and a mixture of water and a surfactant; wherein the surfactant reduces the interfacial tension between water molecules in the water and hydrocarbon molecules in the hydrocarbon stream; contacting the hydrocarbon stream via the distributor plate system with the water and surfactant mixture to create a water/hydrocarbon interface; wherein solids in the hydrocarbon stream are entrained at the water/hydrocarbon interface; allowing gravity to pull entrained solids at the water/hydrocarbon interface into the water phase; removing a hydrocarbon stream with increased solids concentration as compared to the initial hydrocarbon stream from the extracted solids outlet, wherein the extracted solids outlet is located within the water phase portion of the solids removal unit; and removing a hydrocarbon stream with reduced solids concentration as compared to the initial hydrocarbon stream from the reduced solids outlet, wherein the reduced solids outlet is located above the water phase portion of the solids removal unit.

In certain aspects, the surfactant can reduce the interfacial tension between water and hydrocarbons to less than 1 mN/m, and preferably less than 0.1 mN/m. The surfactant can be an ionic or non-ionic surfactant. In a specific embodiment, the surfactant is at least one of sodium bicarbonate and dioctyl sodium sulfosuccinate. In acidic hydrocarbon streams, such as streams with a total acid number greater than 0.4, it can be beneficial to have an alkali surfactant such as sodium carbonate or sodium hydroxyl. In another aspect, the ratio of surfactant to water by weight percentage is less than 10%, e.g. less than 5%, e.g. less than 1%.

In yet another aspect, the distributor plate system comprises a distributor plate oriented in the horizontal plane at the termination of the inlet; wherein the hydrocarbon stream containing an amount of solids exits the inlet and is dispersed about the distributor plate; wherein the distributor plate distributes the hydrocarbon stream containing an amount of solids to the water/hydrocarbon interface. In another embodiment, the distributor plate system comprises a plurality of angled plates within the vessel to create a flowpath for the hydrocarbon stream ascending the vessel through a water phase. The plurality of plates can be affixed to the inner walls of the vessel and contain an opening permit ascension or affixed to a central support post wherein each plate within the plurality of angled plates does not extend fully to each inner wall of the vessel thereby creating an opening to permit ascension. In these embodiments with a plurality of plates, the inlet for the hydrocarbon stream is located in the water phase of the vessel.

In another aspect, the process includes mixing the hydrocarbon stream with water upstream of the solids removal unit. The water upstream of the solids removal unit may also contain a surfactant.

Also provided herein is a system for solids removal comprising: a solids removal unit; wherein the solids removal unit comprises: a vessel containing water and hydrocarbons; wherein the water and hydrocarbons meet at a water/hydrocarbon interface; wherein the water also contains a surfactant; an inlet to receive a hydrocarbon stream containing an amount of solids to the vessel; a distributor plate oriented in the horizontal plane at the termination of the inlet; wherein the hydrocarbon stream containing an amount of solids exits the inlet and is dispersed about the distributor plate; wherein the distributor plate distributes the hydrocarbon stream containing an amount of solids to the water/hydrocarbon interface; an extracted solids outlet, wherein the extracted solids outlet is located within the water phase portion of the solids removal unit; and a reduced solids outlet, wherein the reduced solids outlet is located above the water phase portion of the solids removal unit.

In certain embodiments, the system can include a damper at the termination of the inlet. Additionally, the system can include a water inlet upstream of the distributor plate in fluid communication with the hydrocarbon stream containing an amount of solids. A mixing valve can be placed at the intersection of the water inlet and the hydrocarbon stream containing an amount of solids to promote mixing of water with the hydrocarbon stream before it is distributed to the water/hydrocarbon interface.

A solids removal unit is also provided, the solids removal vessel, comprising: a vessel; an inlet for receiving a hydrocarbon stream containing an amount of solids located in the lower half of the vessel; a plurality of angled plates within the vessel to create a flowpath for the hydrocarbon stream ascending the vessel through a water phase; and an outlet for extracting a hydrocarbon stream with reduced solids concentration as compared to the initial hydrocarbon stream, wherein the outlet is located above the water phase portion of the vessel.

In certain embodiments, each plate within the plurality of angled plates is affixed to the inner walls of the vessel and contains an opening to permit ascension of the hydrocarbon stream through the water phase of the vessel. Alternatively, each plate within the plurality of angle plates is affixed to the support post; wherein each plate within the plurality of angled plates does not extend fully to each inner wall of the vessel thereby creating an opening to permit ascension of the hydrocarbon stream through the water phase of the vessel.

DETAILED DESCRIPTION

In the following detailed description section, specific embodiments of the present techniques are described. However, to the extent that the following description is specific to a particular embodiment or a particular use of the present techniques, this is intended to be for exemplary purposes only and simply provides a description of the exemplary embodiments. Accordingly, the apparatuses and processes encompassed are not limited to the specific embodiments described below, but rather, include all alternatives, modifications, and equivalents falling within the true spirit and scope of the appended claims.

Unless otherwise explained, all technical and scientific terms used herein have the same meaning as commonly understood by one of ordinary skill in the art to which this disclosure pertains. The singular terms "a," "an," and "the" include plural referents unless the context clearly indicates otherwise. Similarly, the word "or" is intended to include "and" unless the context clearly indicates otherwise. The term "includes" means "comprises." All patents and publications mentioned herein are incorporated by reference in their entirety, unless otherwise indicated. In case of conflict as to the meaning of a term or phrase, the present specification, including explanations of terms, control. Directional terms, such as "upper," "lower," "top," "bottom," "front," "back," "vertical," and "horizontal," are used herein to express and clarify the relationship between various elements. It should be understood that such terms do not denote absolute orientation (e.g., a "vertical" component can become horizontal by rotating the device). The materials, methods, and examples recited herein are illustrative only and not intended to be limiting.

Figure 1:
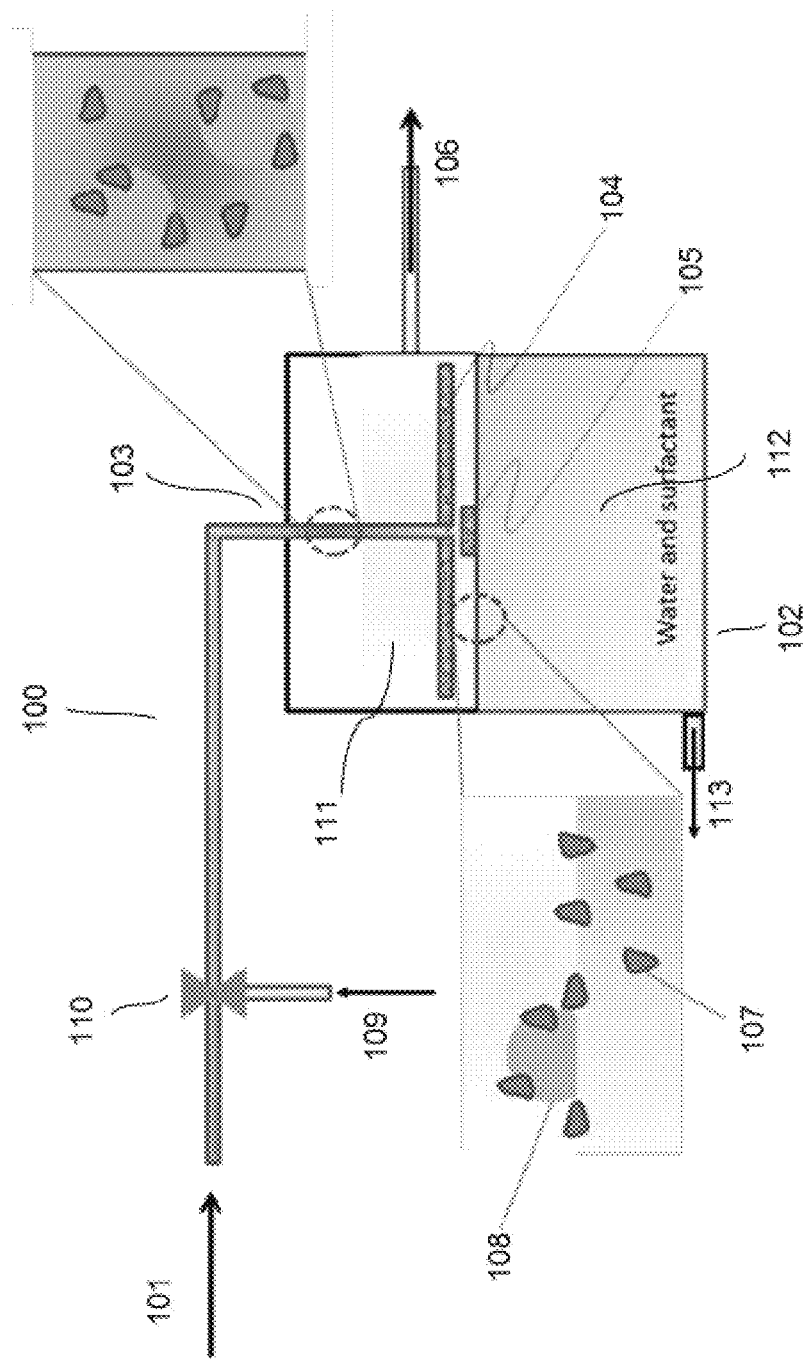
FIG. 1 illustrates an embodiment of a solids removal system according to the present disclosure.

The present disclosure can be better understood with reference to the figures. FIG. 1 provides an illustration of one embodiment of the present disclosure. In solids removal system 100, a hydrocarbon feed 101 containing an amount of entrained solids is fed through inlet 103 into solids removal unit (SRU) 102. SRU 102 can be referred to as a vessel, drum, or any other adequate container. SRU 102 contains liquids in a hydrocarbon phase 111 and a water (or aqueous) phase 112. To further accelerate the transport of solids to the water/hydrocarbon interface, the hydrocarbon-solid mixture may be gently mixed with water to generate large water droplets in the oil. In this case, the solids adsorb onto the water droplets which move faster under gravitational force toward the SRU water/hydrocarbon interface. The hydrocarbon phase 111 and water phase 112 meet at what is termed the water/hydrocarbon interface. The water phase 112 also contains an amount of surfactant. As used herein, "surfactant" refers to a compound(s) that lowers the surface tension or interfacial tension between two liquids or between a liquid and a solid. Surfactants are amphiphillic, which means they contain both hydrophobic groups and hydrophilic groups. Example surfactants suitable for the presently disclosed application include anionic surfactants, cationic surfactants, zwitterionic surfactants, and nonionic surfactants. Specific examples include bicarbonates, sulfates, sulfonates, carboxylates, and phosphates. In certain embodiments the surfactant is dioctyl sodium sulfosuccinate (DSSS) surfactant. Alkali such sodium carbonate and sodium hydroxyl can be used in water when the hydrocarbon is acidic. An example of an acidic hydrocarbon is crude oil or oil sand with total acid number (TAN) greater than 0.4.

The presence of the surfactant is to reduce the interfacial tension between the hydrocarbon and water below 1 mN/m, preferentially below 0.1 mN/m. The weight percentage of surfactant within the water phase can vary, but suitable percentages include less than 10%, less than 5%, or less than 1%, such as 0.1% or 0.5%.

The systems, processes, and apparatus described herein will typically operate at ambient pressure and temperature conditions. However, without the loss of generality, the system can be used at elevated temperature and pressure to reduce viscosity of hydrocarbon when desirable. As used herein, "ambient" refers the temperature or pressure of the surrounding environment and will usually be understood to mean 15-30° C. (although in colder or warmer climates ambient temperature may be lower or higher than that range, which is not meant to be limiting) and 80-120 kPa (although in lower or higher elevations ambient pressure may be lower or higher than that range, which is not meant to be limiting).

At the termination of inlet 103 hydrocarbon feed 101 is dispersed about distributor plate 104. In this manner, the hydrocarbon feed 101 containing an amount of entrained solids is brought more directly and evenly in contact with the planar water/hydrocarbon interface. The distributor plate 104 can be located slightly above or within the water phase 112. A damper 105 may optionally be incorporated into the design to promote less turbulent introduction of hydrocarbon feed 101 to the water/hydrocarbon interface. Solids entrained in hydrocarbon feed 101 at the water/hydrocarbon interface become trapped at the interface. The interfacial force between the two phases is significantly reduced because of the surfactant, causing the gravitational force to effectively pull the trapped solids out of the hydrocarbon phase 111 and into the water phase 112. A relatively clean, reduced solids hydrocarbon feed 106 then exits SRU 102 through a port located above water phase 112. Extracted solids and water are removed via outlet port 113. The relatively clean hydrocarbon feed 106 can be put back to the SRU trough 101 using a pump (not shown in figure for simplicity) for further solids removal if needed.

Optionally, a water feed 109 can be introduced to hydrocarbon feed 101 upstream of SRU 102 via mixing valve 110 to generate large water droplets within hydrocarbon feed 101. Solids within hydrocarbon feed 101 adsorb onto the water droplets, which further accelerates the transport of solids to the water/hydrocarbon interface because the water droplets move faster under gravitational force than hydrocarbon feed 101. An exploded view of this embodiment is shown in FIG. 1 where solids 107 are adsorbed onto water droplet 108. As described above, the surfactant-reduced interfacial force between the two phases causes the gravitational force to effectively pull the trapped solids out of the hydrocarbon phase 111 and into the water phase 112.

Figure 2:
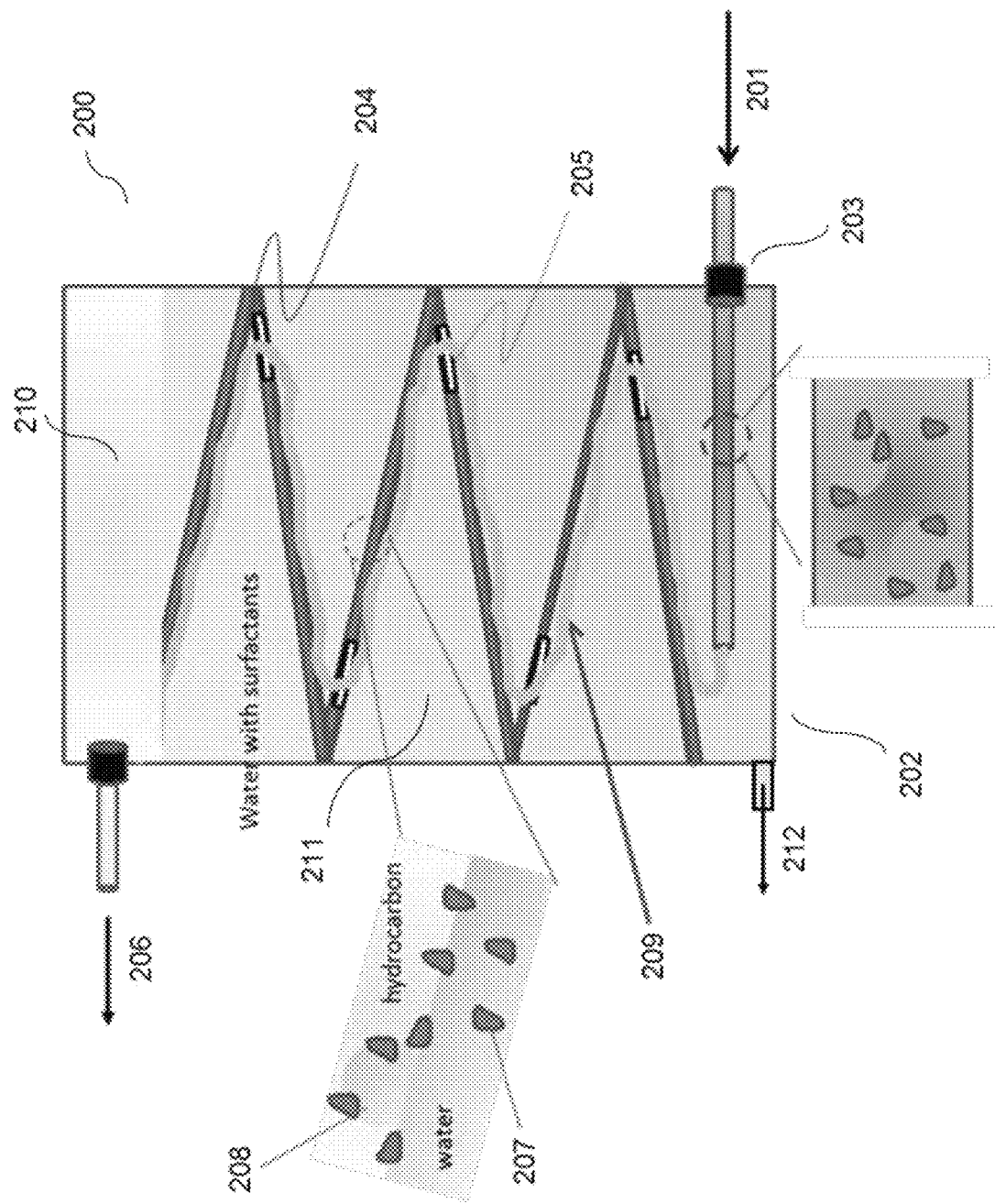
FIG. 2 illustrates an embodiment of a solids removal system according to the present disclosure.

An alternative embodiment is shown in FIG. 2 with solids removal system 200. In this embodiment hydrocarbon stream 201 enters SRU 202 via inlet 203, which is located in water phase 211 of SRU 202. Hydrocarbon stream 201 ascends SRU 202 via hydrocarbon flowpath 209. Hydrocarbon flowpath 209 is shaped by a plurality of adjustable, angled plates 204. Plates 204 are angled so that density differences between hydrocarbon stream 201 and water phase 211 permits the hydrocarbon stream 201 to ascend SRU 202 along the lower surface of plates 204. Each plate 204 includes an opening 205 so that hydrocarbon stream 201 may ascend to the subsequent plate 204. An exploded depiction of the water/hydrocarbon interface created by the hydrocarbon flowpath 209 and adjustable, angled plates 204 is depicted in FIG. 2. Solids 207 are pulled by gravity out of hydrocarbon stream 201 and into water phase 211. Use of surfactants reduces the interfacial force between the two phases which promotes solids entering the water phase. As in FIG. 1, water can be introduced to hydrocarbon stream 201 upstream of SRU 202. Solids 207 will adsorb onto water droplets 208 and can then be pulled into the water phase 211 via gravity. Hydrocarbon flowpath 209 terminates at hydrocarbon phase 210. A relatively clean, reduced solids hydrocarbon feed 206 then exits SRU 202 through a port located above water phase 211. Extracted solids and water are removed via outlet port 212. The relatively clean hydrocarbon feed 206 can be put back to the SRU trough 201 using a pump (not shown in figure for simplicity) for further solids removal if needed.

Figure 3:
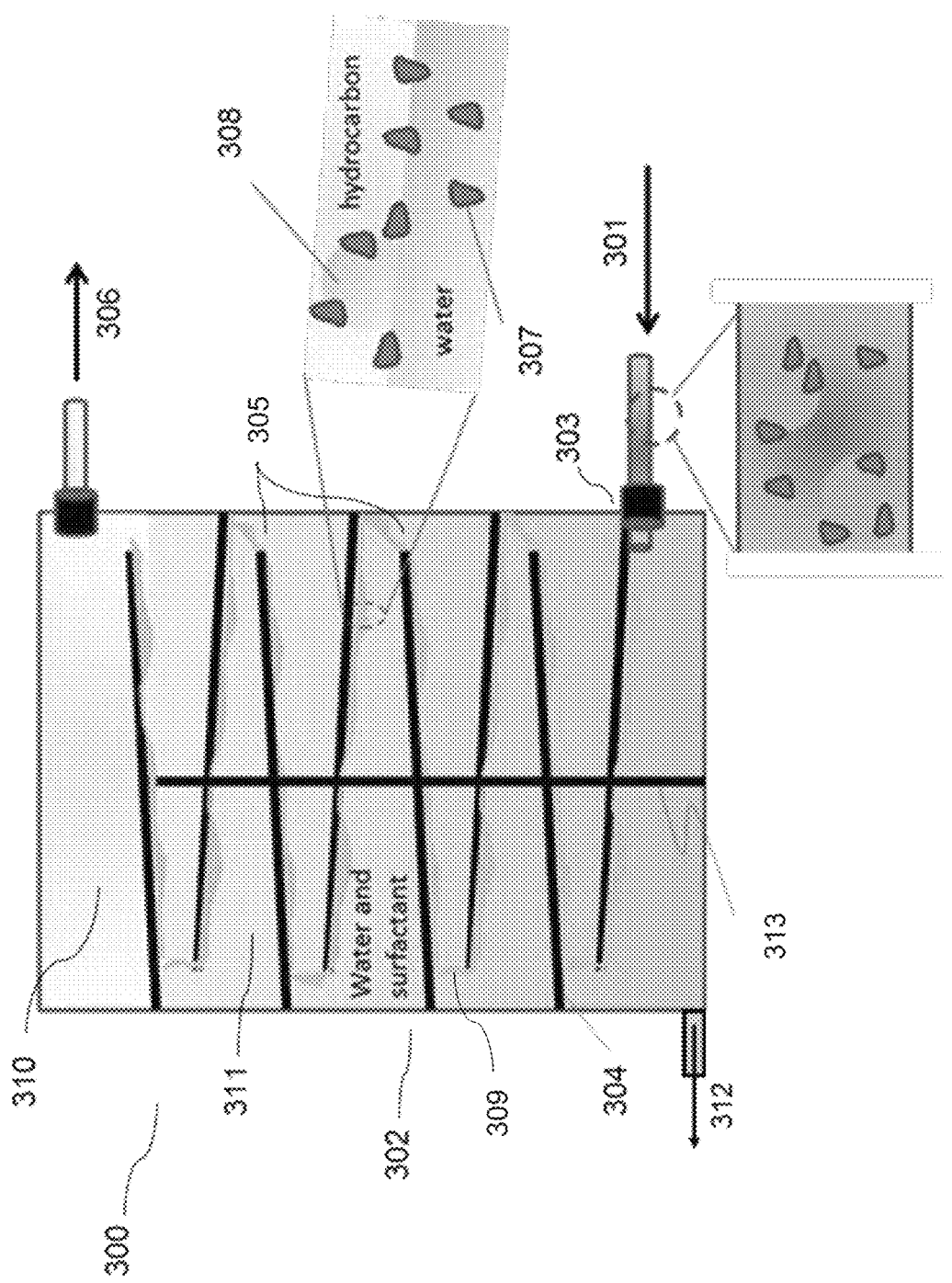
FIG. 3 illustrates an embodiment of a solids removal system according to the present disclosure.

Yet another embodiment is shown in FIG. 3 with solids removal system 300. In this embodiment hydrocarbon stream 301 enters SRU 302 via inlet 303, which is located in water phase 311 of SRU 302. Hydrocarbon stream 301 ascends SRU 302 via hydrocarbon flowpath 309. Hydrocarbon flowpath 309 is shaped by a plurality of adjustable, angled plates 304. Plates 304 are angled so that density differences between hydrocarbon stream 301 and water phase 311 permits the hydrocarbon stream 301 to ascend SRU 302 along the lower surface of plates 304. Each plate 304 does not span the entire width of SRU 302 thereby creating openings 305 to permit hydrocarbon stream 301 to ascend to the subsequent plate 304. Because the plates 304 are not affixed to SRU 302 on all sides, support post 313 is provided to support plates 304. An exploded depiction of the water/hydrocarbon interface created by the hydrocarbon flowpath 309 and adjustable, angled plates 304 is depicted in FIG. 3. Solids 307 are pulled by gravity out of hydrocarbon stream 301 and into water phase 311. Use of surfactants reduces the interfacial force between the two phases which promotes solids entering the water phase. As in FIG. 1, water can be introduced to hydrocarbon stream 301 upstream of SRU 302. Solids 307 will adsorb onto water droplets 308 and can then be pulled into the water phase 311 via gravity. Hydrocarbon flowpath 309 terminates at hydrocarbon phase 310. A relatively clean, reduced solids hydrocarbon feed 306 then exits SRU 302 through a port located above water phase 311. Extracted solids and water are removed via outlet port 312. The relatively clean hydrocarbon feed 310 can be put back to the SRU trough 301 using a pump (not shown in figure for simplicity) for further solids removal if needed.

EXAMPLES

Example 1: Removing Solid Particles from Crude Samples

Figure 4:
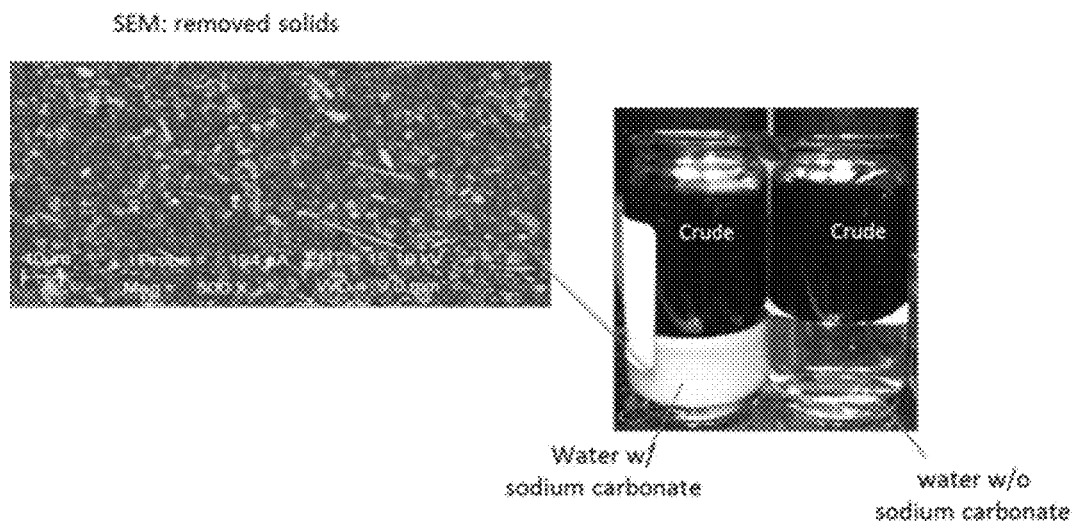
FIG. 4 depicts the results of Example 1 pictorially and via scanning electron microscopy.

In a small glass container 27 grams of an acidic crude oil was introduced to 30 grams of deionized water. The two components were permitted to separate and were left for five days. In a second, similar glass container 27 grams of crude oil was introduced to 30 grams of water containing 0.1% by weight of sodium carbonate for five days. Sodium carbonate is known to significantly reduce interfacial tension between acidic crude oil and water. As shown in FIG. 4, the water phase of the second container exhibited a yellowish, turbid character indicating the presence of solids. The water phase of the reference container remained mostly clear. Scanning electron microscopy of the filtered materials in the water phase of the second container, also shown in FIG. 4, revealed the presence of solids in the water phase. This examples provides a proof of concept of removing particles from a hydrocarbon stream using a water/hydrocarbon interface when oil/water interfacial tension is reduced. Scanning electron microscopy was conducted on a Hitachi 4800 scanning electron microscope using an accelerating voltage between 1 and 20 keV.

Figure 5:
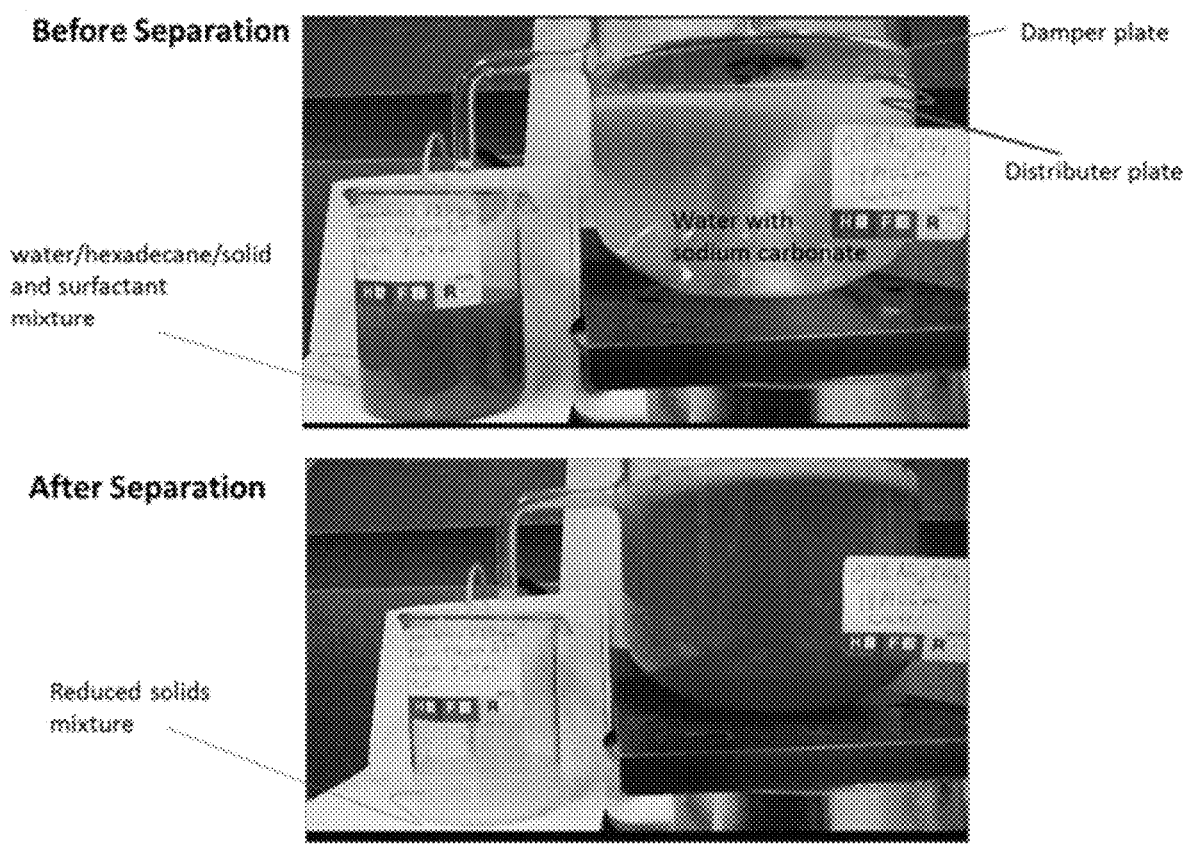
FIG. 5 depicts the results of Example 2 pictorially.

Example 2: Removing Solid Particles (e.g. Iron Oxide) Using a Laboratory SRU 0.032 grams of solid iron oxide powder were blended in 74.2 grams of hexadecane. The hexadecane contained 0.26 grams of dioctyl sodium sulfosuccinate (DSSS) surfactant. This mixture was then stirred with 24 grams of deionized water using a magnetic stirrer. The reddish, cloudy color of the mixture, shown in FIG. 5, is the indication of existence of iron oxide in water/hexadecane/surfactant mixture. The water/hexadecane/solid mixture was then pumped through a Teflon pipe and stainless steel tube into a laboratory SRU as shown in FIG. 5. The laboratory SRU received the water/hexadecane/solid mixture below the distributing plate just above the water phase of the laboratory SRU. The water phase of the laboratory SRU contained 0.1% by weight of sodium carbonate. After turning on the pump a thin layer of the water/hexadecane/solid mixture flows onto the surface of the water phase in the SRU and then returns to its original container outside the SRU. The two pictures in FIG. 5 show depictions of the liquids before (top) and after (bottom) 111 minutes of treatment in the laboratory SRU. As shown, the water/hexadecane/solid mixture goes from a quite cloudy red color to mostly clear indicating that iron oxide solids were removed from the mixture and into the water phase.

This example demonstrates that the SRU is capable of removing solids from an oil/water mixture. It is believed that mixing water with hexadecane/solids encourages the solids to adsorb onto the surface of water droplets. Pumping the mixture to the surface of the SRU brings the particles and especially solids that are adsorbed onto the droplets close to the SRU water surface. The solids were then trapped at the interface and removed from the mixture. The addition of surfactant in the oil and water reduces the interfacial tension of the water/oil interface allowing the trapped solids to fall into the water phase of the SRU.

Figure 6:
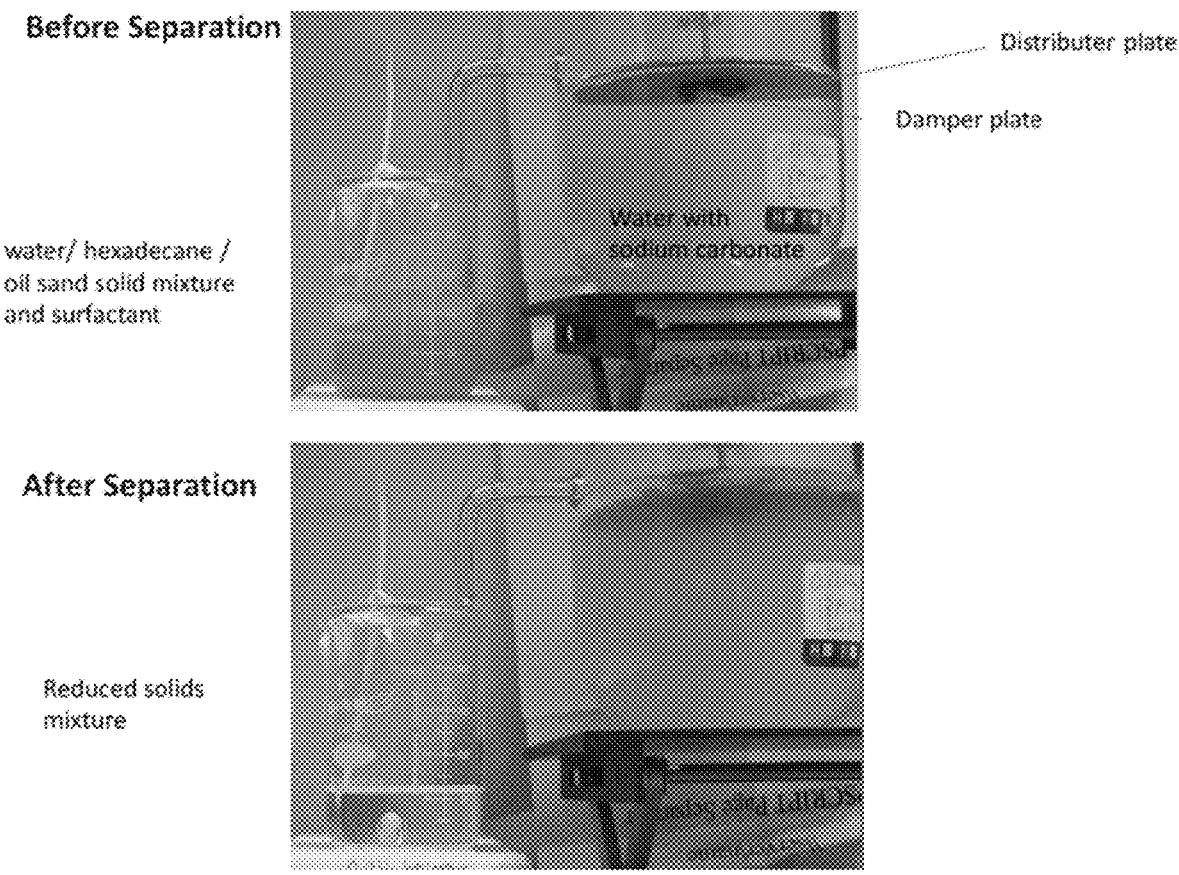
FIG. 6 depicts the results of Example 3 pictorially.

Example 3: Removing Solid Particles (e.g. Oil Coated Solids) Using a Laboratory SRU 0.032 grams of oil coated solids were blended in 74.2 grams of hexadecane. The oil coated solids were comparable to extracted solids from oil sand. The yellowish color of mixture is the indication of the existence of oil coated solids in the mixture. The hexadecane contained 0.26 grams of DSSS surfactant. This mixture was then stirred with 24 grams of deionized water using a magnetic stirrer. The water/hexadecane/solid mixture was then pumped through a Teflon pipe and stainless steel tube into a laboratory SRU as shown in FIG. 6. The laboratory SRU received the water/hexadecane/solid mixture below the distributing plate just above the water phase of the laboratory SRU. The water phase of the laboratory SRU contained 0.1% sodium carbonate by weight. After turning on the pump a thin layer of the water/hexadecane/solid mixture flows onto the surface of the water phase in the SRU and then returns to its original container outside the SRU. The two pictures in FIG. 6 show depictions of the liquids before (top) and after (bottom) 210 minutes of treatment in the laboratory SRU. As shown, the water/hexadecane/solid mixture goes from a quite cloudy yellowish color to mostly clear indicating that solids were removed from the mixture and into the water phase. This example demonstrates that the SRU is capable of removing solids from an oil/water mixture.

Additional Embodiments

Embodiment 1

A process of removing solids from hydrocarbon streams: providing an initial hydrocarbon stream, wherein the hydrocarbon stream contains an amount of solids; feeding the hydrocarbon stream to a solids removal unit through an inlet, wherein the solids removal unit comprises a vessel, a distributor plate system, a reduced solids outlet, an extracted solids outlet, and a mixture of water and a surfactant; wherein the surfactant reduces the interfacial tension between water molecules in the water and hydrocarbon molecules in the hydrocarbon stream; contacting the hydrocarbon stream via the distributor plate system with the water and surfactant mixture to create a water/hydrocarbon interface; wherein solids in the hydrocarbon stream are entrained at the water/hydrocarbon interface; allowing gravity to pull entrained solids at the water/hydrocarbon interface into the water phase; removing a hydrocarbon stream with increased solids concentration as compared to the initial hydrocarbon stream from the extracted solids outlet, wherein the extracted solids outlet is located within the water phase portion of the solids removal unit; and removing a hydrocarbon stream with reduced solids concentration as compared to the initial hydrocarbon stream from the reduced solids outlet, wherein the reduced solids outlet is located above the water phase portion of the solids removal unit.

Embodiment 2

The process of embodiment 1, wherein the surfactant reduces the interfacial tension to less than 1 mN/m.

Embodiment 3

The process of embodiment 2, wherein the surfactant reduces the interfacial tension to less than 0.1 mN/m.

Embodiment 4

The process of any of the previous embodiments, wherein the surfactant is an ionic surfactant.

Embodiment 5

The process of any of the previous embodiments, wherein the surfactant is at least one of sodium bicarbonate and dioctyl sodium sulfosuccinate.

Embodiment 6

The process of any of the previous embodiments, wherein the initial hydrocarbon feed has a total acid number greater than 0.4.

Embodiment 7

The process of any of the previous embodiments, wherein the ratio of surfactant to water by weight percentage is less than 10%.

Embodiment 8

The process of any of the previous embodiments, wherein the ratio of surfactant to water by weight percentage is less than 5%.

Embodiment 9

The process of any of the previous embodiments, wherein the ratio of surfactant to water by weight percentage is less than 1%.

Embodiment 10

The process of any of the previous embodiments, wherein the distributor plate system comprises: a distributor plate oriented in the horizontal plane at the termination of the inlet; wherein the hydrocarbon stream containing an amount of solids exits the inlet and is dispersed about the distributor plate; wherein the distributor plate distributes the hydrocarbon stream containing an amount of solids to the water/hydrocarbon interface.

Embodiment 11

The process of any of the previous embodiments, wherein the inlet is located in the lower half of the vessel and the distributor plate system comprises: a plurality of angled plates within the vessel to create a flowpath for the hydrocarbon stream ascending the vessel through a water phase.

Embodiment 12

The process of embodiment 11, wherein each plate within the plurality of angled plates is affixed to the inner walls of the vessel and contains an opening to permit ascension of the hydrocarbon stream through the water phase of the vessel.

Embodiment 13

The process of embodiment 11, wherein the vessel further comprises a support post; wherein each plate within the plurality of angle plates is affixed to the support post; wherein each plate within the plurality of angled plates does not extend fully to each inner wall of the vessel thereby creating an opening to permit ascension of the hydrocarbon stream through the water phase of the vessel.

Embodiment 14

The process of any of the previous embodiments, further comprising: mixing the hydrocarbon stream with water upstream of the solids removal unit.

Embodiment 15

The process of embodiment 14, wherein the water mixed with the hydrocarbon stream also contains a surfactant.

Embodiment 16

A system for solids removal comprising: a solids removal unit; wherein the solids removal unit comprises: a vessel containing water and hydrocarbons; wherein the water and hydrocarbons meet at a water/hydrocarbon interface; wherein the water also contains a surfactant; an inlet to receive a hydrocarbon stream containing an amount of solids to the vessel; a distributor plate oriented in the horizontal plane at the termination of the inlet; wherein the hydrocarbon stream containing an amount of solids exits the inlet and is dispersed about the distributor plate; wherein the distributor plate distributes the hydrocarbon stream containing an amount of solids to the water/hydrocarbon interface; an extracted solids outlet, wherein the extracted solids outlet is located within the water phase portion of the solids removal unit; and a reduced solids outlet, wherein the reduced solids outlet is located above the water phase portion of the solids removal unit.

Embodiment 17

The system of embodiment 17, further comprising a damper at the termination of the inlet.

Embodiment 18

The system of embodiment 16 or 17, further comprising: a water inlet upstream of the distributor plate in fluid communication with the hydrocarbon stream containing an amount of solids.

Embodiment 19

The system of embodiment 18, further comprising: a mixing valve at the intersection of the water inlet and the hydrocarbon stream containing an amount of solids to promote mixing of water with the hydrocarbon stream before it is distributed to the water/hydrocarbon interface.

Embodiment 20

A solids removal unit, comprising: a vessel; an inlet for receiving a hydrocarbon stream containing an amount of solids located in the lower half of the vessel; a plurality of angled plates within the vessel to create a flowpath for the hydrocarbon stream ascending the vessel through a water phase; and an outlet for extracting a hydrocarbon stream with reduced solids concentration as compared to the initial hydrocarbon stream, wherein the outlet is located above the water phase portion of the vessel.

Embodiment 21

The solids removal unit of embodiment 20, wherein each plate within the plurality of angled plates is affixed to the inner walls of the vessel and contains an opening to permit ascension of the hydrocarbon stream through the water phase of the vessel.

Embodiment 22

The solids removal unit of embodiment 20, further comprising a support post within the vessel, wherein each plate within the plurality of angle plates is affixed to the support post; wherein each plate within the plurality of angled plates does not extend fully to each inner wall of the vessel thereby creating an opening to permit ascension of the hydrocarbon stream through the water phase of the vessel.

The invention claimed is:

1. A process of removing solids from hydrocarbon streams:
providing an initial hydrocarbon stream, wherein the hydrocarbon stream consists essentially of a hydrocarbon and an amount of solids;
feeding the hydrocarbon stream to a solids removal unit through an inlet with a damper at the termination of the inlet to promote less turbulent flow of the hydrocarbon stream, wherein the solids removal unit comprises a vessel, a distributor plate system, a reduced solids outlet, an extracted solids outlet, and a mixture of water and a surfactant; wherein the surfactant reduces the interfacial tension between water molecules in the water and hydrocarbon molecules in the hydrocarbon stream;
contacting the hydrocarbon stream via the distributor plate system with the water and surfactant mixture to create a water/hydrocarbon interface; wherein solids in the hydrocarbon stream are entrained at the water/hydrocarbon interface;
allowing gravity to pull entrained solids at the water/hydrocarbon interface into a water phase;

removing a water stream with increased solids concentration as compared to the initial hydrocarbon stream from the extracted solids outlet, wherein the extracted solids outlet is located within the water phase portion of the solids removal unit; and removing a hydrocarbon stream with reduced solids concentration as compared to the initial hydrocarbon stream from the reduced solids outlet, wherein the reduced solids outlet is located above the water phase portion of the solids removal unit.

2. The process of claim 1, wherein the surfactant reduces the interfacial tension to less than 1 mN/m.

3. The process of claim 2, wherein the surfactant reduces the interfacial tension to less than 0.1 mN/m.

4. The process of claim 1, wherein the surfactant is an ionic surfactant.

5. The process of claim 1, wherein the surfactant is at least one of sodium bicarbonate and dioctyl sodium sulfosuccinate.

6. The process of claim 1, wherein the initial hydrocarbon feed has a total acid number greater than 0.4.

7. The process of claim 6, wherein the surfactant is alkali.

8. The process of claim 1, wherein the ratio of surfactant to water by weight percentage is less than 10%.

9. The process of claim 8, wherein the ratio of surfactant to water by weight percentage is less than 5%.

10. The process of claim 9, wherein the ratio of surfactant to water by weight percentage is less than 1%.

11. The process of claim 1, wherein the distributor plate system comprises:

a distributor plate oriented in the horizontal plane at the termination of the inlet; wherein the hydrocarbon stream containing an amount of solids exits the inlet and is dispersed about the distributor plate; wherein the distributor plate distributes the hydrocarbon stream containing an amount of solids to the water/hydrocarbon interface.

12. The process of claim 1, wherein the inlet is located in the lower half of the vessel and the distributor plate system comprises:

a plurality of angled plates within the vessel to create a flowpath for the hydrocarbon stream ascending the vessel through a water phase.

13. The process of claim 12, wherein each plate within the plurality of angled plates is affixed to the inner walls of the vessel and contains an opening to permit ascension of the hydrocarbon stream through the water phase of the vessel.

14. The process of claim 12, wherein the vessel further comprises a support post;

wherein each plate within the plurality of angle plates is affixed to the support post; wherein each plate within the plurality of angled plates does not extend fully to each inner wall of the vessel thereby creating an opening to permit ascension of the hydrocarbon stream through the water phase of the vessel.

15. The process of claim 1, further comprising:

mixing the hydrocarbon stream with water upstream of the solids removal unit.

16. The process of claim 15, wherein the water mixed with the hydrocarbon stream also contains a surfactant.

* * * * *